US012738633B2

(12) United States Patent
Lien et al.

(10) Patent No.: US 12,738,633 B2
(45) Date of Patent: Sep. 15, 2026

(54) ELECTRONIC DEVICE AND ANTENNA MODULE

(71) Applicant: WISTRON NEWEB CORPORATION, Hsinchu (TW)

(72) Inventors: Chung-Che Lien, Hsinchu (TW); Tzu-Kuan Sun, Hsinchu (TW); Ting-Han Shih, Hsinchu (TW); Chia-Hao Chang, Hsinchu (TW)

(73) Assignee: WISTRON NEWEB CORPORATION, Hsinchu (TW)

(*) Notice: Subject to any disclaimer, the term of this patent is extended or adjusted under 35 U.S.C. 154(b) by 98 days.

(21) Appl. No.: 18/763,353

(22) Filed: Jul. 3, 2024

(65) Prior Publication Data

US 2025/0125517 A1 Apr. 17, 2025

(30) Foreign Application Priority Data

Oct. 17, 2023 (TW) ................................ 112139478

(51) Int. Cl.
*H01Q 1/22* (2006.01)
*H01Q 1/27* (2006.01)
(Continued)

(52) U.S. Cl.
CPC ............ *H01Q 1/2266* (2013.01); *H01Q 1/27* (2013.01); *H01Q 1/42* (2013.01); *H01Q 9/16* (2013.01)

(58) Field of Classification Search
CPC .......... H01Q 1/2266; H01Q 1/27; H01Q 1/42; H01Q 9/16; H01Q 5/378; H01Q 1/22; H01Q 5/371; H01Q 9/42
See application file for complete search history.

(56) References Cited

U.S. PATENT DOCUMENTS 7,050,010 B2 5/2006 Wang et al.
10,431,885 B2 * 10/2019 Tseng .................... H01Q 1/422
(Continued)

FOREIGN PATENT DOCUMENTS

CN 101183746 A * 5/2008
CN 107104270 A * 8/2017 .............. H01Q 1/36
(Continued)

*Primary Examiner* — Dameon E Levi
*Assistant Examiner* — Jose A. Miranda Gonzalez
(74) *Attorney, Agent, or Firm* — McClure, Qualey & Rodack, LLP

(57) ABSTRACT

An electronic device includes a housing and an antenna module. The antenna module is disposed in the housing. The antenna module includes a first radiating element, a switching circuit, a proximity sensing circuit, a second radiating element, and a third radiating element. The first radiating element includes a feeding portion, a radiating portion, and a grounding portion. The feeding portion and the grounding portion are connected to the radiating portion. The second radiating element is electrically connected to the switching circuit. The second radiating element and the radiating portion are separated from and coupled with each other. The third radiating element is electrically connected to the proximity sensing circuit. The third radiating element and the second radiating element are separated from each other, and the third radiating element and the radiating portion are separated from and coupled with each other.

19 Claims, 8 Drawing Sheets

(51) Int. Cl.
*H01Q 1/42* (2006.01)
*H01Q 9/16* (2006.01)

(56) References Cited

U.S. PATENT DOCUMENTS

| | | | | |
|---|---|---|---|---|
| 10,707,568 | B2 * | 7/2020 | Tseng | H01Q 5/371 |
| 2016/0134017 | A1 * | 5/2016 | Lin | H01Q 5/378 343/861 |
| 2018/0048076 | A1 * | 2/2018 | Wei | H01Q 21/30 |
| 2018/0083344 | A1 * | 3/2018 | Han | H01Q 13/106 |
| 2019/0027833 | A1 * | 1/2019 | Ayala Vazquez | H01Q 5/342 |
| 2019/0044232 | A1 * | 2/2019 | Tseng | H01Q 1/245 |
| 2021/0167491 | A1 * | 6/2021 | Chang | H01Q 1/48 |
| 2021/0351509 | A1 * | 11/2021 | Lin | H01Q 1/245 |
| 2024/0213681 | A1 * | 6/2024 | Chang | H01Q 1/245 |

FOREIGN PATENT DOCUMENTS

| | | | | |
|---|---|---|---|---|
| CN | 115117600 | A * | 9/2022 | H01Q 1/36 |
| TW | 202143554 | A | 11/2021 | |

* cited by examiner

ELECTRONIC DEVICE AND ANTENNA MODULE

CROSS-REFERENCE TO RELATED PATENT APPLICATION

This application claims the benefit of priority to Taiwan Patent Application No. 112139478, filed on Oct. 17, 2023. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to an electronic device and an antenna module, and more particularly to an electronic device and an antenna module capable of improving a sensing distance of a proximity sensing circuit and optimizing antenna characteristics.

BACKGROUND OF THE DISCLOSURE

Currently, exterior designs of electronic devices, such as notebook computers, are developed toward being thinner and more lightweight. Therefore, an antenna structure of the electronic device is very limited by an internal space of the electronic device. In addition, when the antenna structure inside the electronic device is equipped with a proximity sensing circuit, a radiating element of the antenna structure is usually used as a sensing electrode. However, the radiating element used as the sensing electrode is limited by the design of the antenna structure, thereby resulting in an insufficient sensing distance of the proximity sensing circuit.

Therefore, how to overcome the above-mentioned problem through an improvement in structural design has become an important issue to be addressed in the related art.

SUMMARY OF THE DISCLOSURE

In response to the above-referenced technical inadequacy, the present disclosure provides an electronic device and an antenna module, which can address an issue of the proximity sensing circuit used with the antenna structure having an insufficient sensing distance.

In order to solve the above-mentioned problems, one of the technical aspects adopted by the present disclosure is to provide an electronic device, which includes a housing and an antenna module. The antenna module is disposed in the housing. The antenna module includes a first radiating element, a switching circuit, a proximity sensing circuit, a second radiating element, and a third radiating element. The first radiating element includes a feeding portion, a radiating portion, and a grounding portion. The feeding portion and the grounding portion are connected to the radiating portion. The second radiating element is electrically connected to the switching circuit. The second radiating element and the radiating portion are separated from and coupled with each other. The third radiating element is electrically connected to the proximity sensing circuit. The third radiating element and the second radiating element are separated from each other, and the third radiating element and the radiating portion are separated from and coupled with each other.

In order to solve the above-mentioned problems, another one of the technical aspects adopted by the present disclosure is to provide an antenna module, which includes a first radiating element, a switching circuit, a proximity sensing circuit, a second radiating element, and a third radiating element. The first radiating element includes a feeding portion, a radiating portion, and a grounding portion. The feeding portion and the grounding portion are connected to the radiating portion. The second radiating element is electrically connected to the switching circuit. The second radiating element and the radiating portion are separated from and coupled with each other. The third radiating element is electrically connected to the proximity sensing circuit. The third radiating element and the second radiating element are separated from each other, and the third radiating element and the radiating portion are separated from and coupled with each other.

Therefore, in the electronic device and the antenna module provided by the present disclosure, by virtue of "the third radiating element being electrically connected to the proximity sensing circuit" and "the third radiating element and the second radiating element being separated from each other, and the third radiating element and the radiating portion being separated from and coupled with each other," the proximity sensing circuit of the antenna module can be used with an independent radiating element (i.e., the third radiating element). Therefore, the third radiating element can optimize the antenna characteristics and generate dual low-frequency mode with the second radiating element to achieve wider-band operation. In addition, the wider-band operation could save the number of paths of the switching circuit.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which.

DETAILED DESCRIPTION OF THE EXEMPLARY EMBODIMENTS

Figure 1:
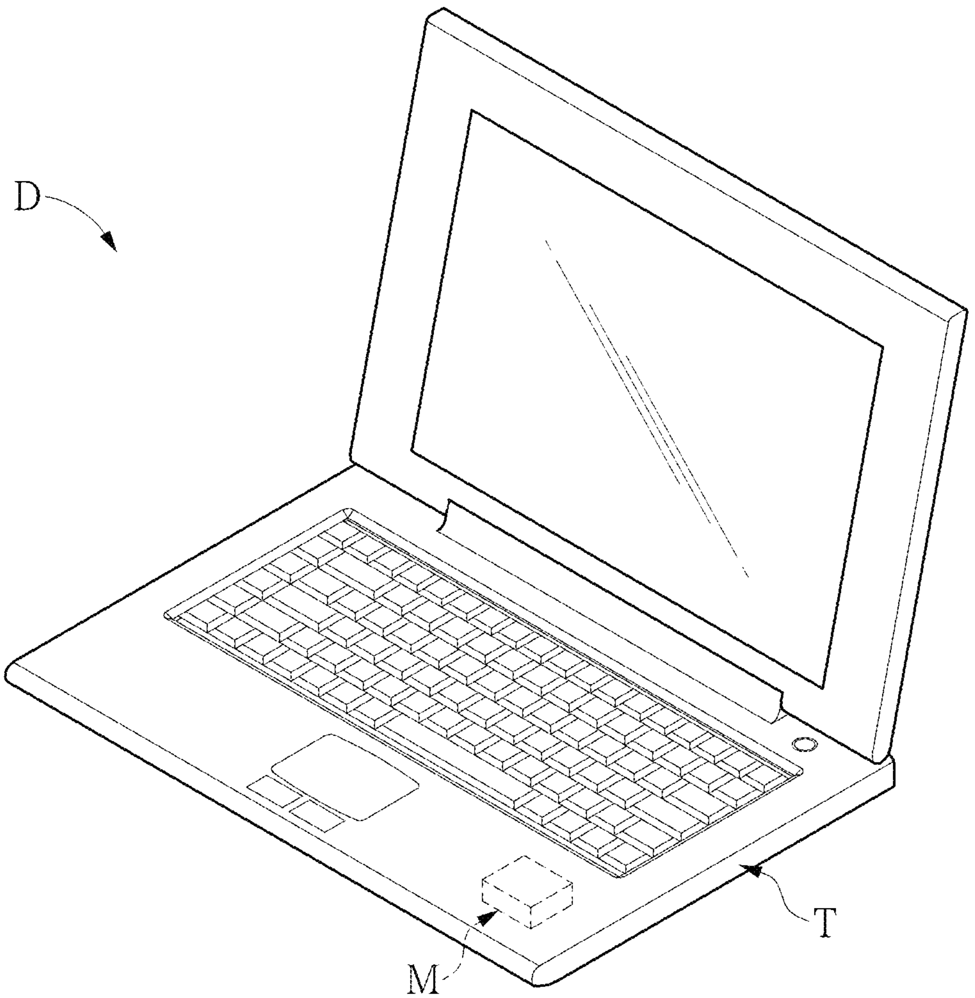
FIG. 1 is a schematic view of an electronic device according to the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a," "an" and "the" includes plural reference, and the meaning of "in" includes "in" and "on." Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first," "second" or "third" can be used to describe various components, signals or the like, which are for distinguishing one component/signal from another one only, and are not intended to, nor should be construed to impose any substantive limitations on the components, signals or the like.

In addition, the term "connect" or "connected" in the context of the present disclosure means that there is a physical connection between two elements, and the two elements are directly or indirectly connected. The term "couple" or "coupled" in the context of the present disclosure means that two elements are separate from each other and have no physical connection therebetween, and an electric field energy generated by one of the two elements excites an electric field energy generated by another one of the two elements.

Embodiment

Referring to FIG. 1, FIG. 1 is a schematic view of an electronic device according to the present disclosure. The present disclosure provides an electronic device D, which includes a housing T and an antenna module M disposed in the housing T. The electronic device D can be a smart phone, a tablet computer, or a notebook computer. However, the present disclosure is not limited thereto. In the present disclosure, the electronic device D is exemplified as the notebook computer. At least one part of the housing T can be a metal housing. In addition, the position and quantity of the antenna module M in the electronic device D are not limited in the present disclosure.

Figure 2:
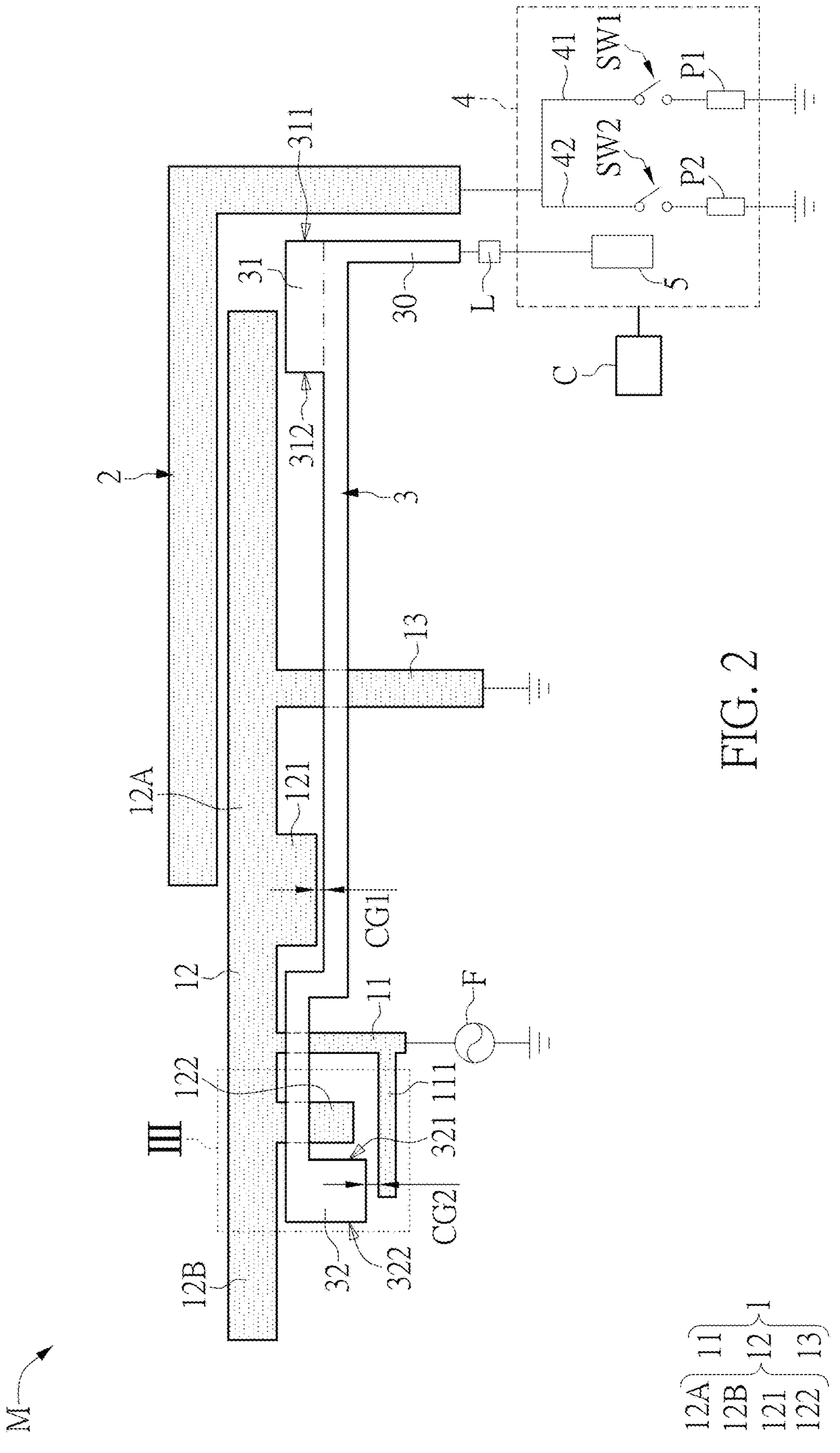
FIG. 2 is a schematic view of an antenna module according to the present disclosure.
Figure 3:
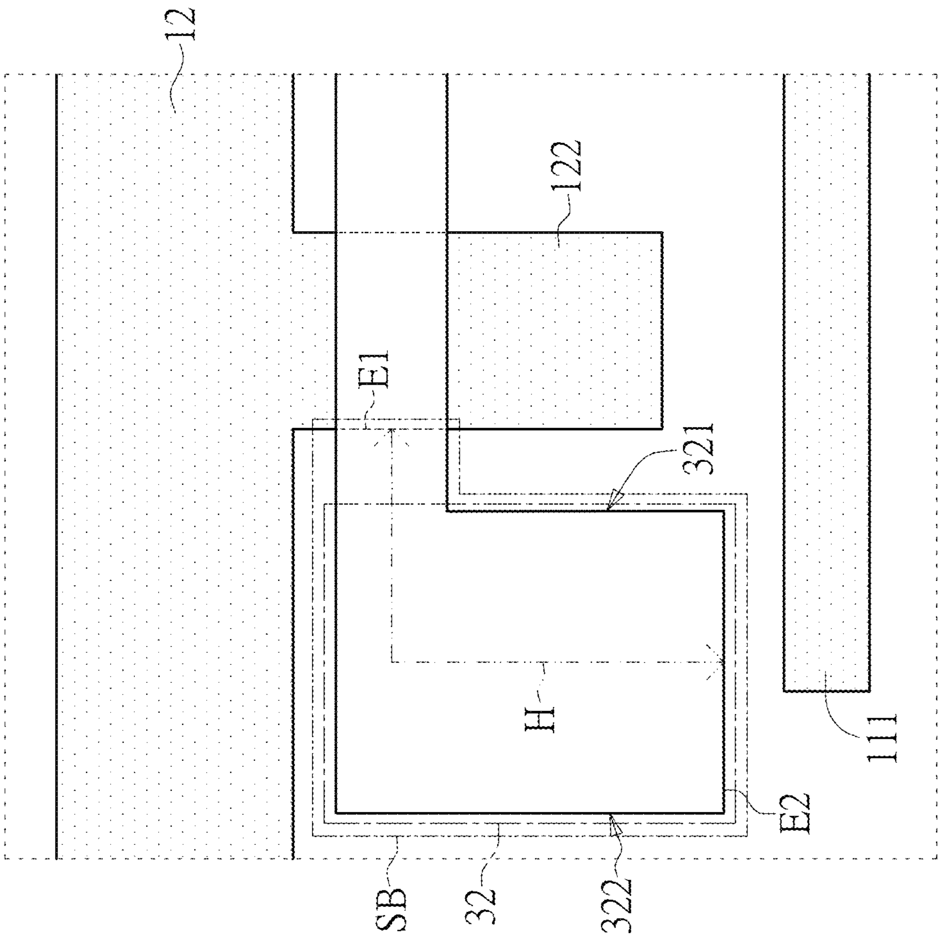
FIG. 3 is a schematic enlarged view of part III of FIG. 2.

Referring to FIG. 2 and FIG. 3, FIG. 2 is a schematic view of an antenna module according to the present disclosure, and FIG. 3 is a schematic enlarged view of part III of FIG. 2. The present disclosure provides an antenna module M, and the antenna module M includes a first radiating element 1, a second radiating element 2, a third radiating element 3, a switching circuit 4, and a proximity sensing circuit 5.

The first radiating element 1 includes a feeding portion 11, a radiating portion 12, and a grounding portion 13. The feeding portion 11 and the grounding portion 13 are connected to the radiating portion 12, and the feeding portion 11 is electrically connected to a feeding element F. The first radiating element 1 forms a planar inverted-F antenna. The feeding element F can feed a signal to the first radiating element 1 through the feeding portion 11, such that the antenna module M generates at least one operating frequency band.

The third radiating element 3 and the second radiating element 2 are separated from each other. The second radiating element 2 and the radiating portion 12 are separated from and coupled with each other. The third radiating element 3 and the radiating portion 12 are separated from and coupled with each other.

Specifically, the third radiating element 3 and the radiating portion 12 are coupled to each other with the cooperation of the switching circuit 4, so as to generate an operating frequency band from 617 MHz to 800 MHz.

The second radiating element 2 is electrically connected to the switching circuit 4. The second radiating element 2 and the radiating portion 12 are coupled to each other with the cooperation of the switching circuit 4, so as to generate an operating frequency band from 750 MHz to 960 MHz.

The switching circuit 4 can include one or more signal transmission paths, but the present disclosure is not limited thereto. For example, the switching circuit 4 includes a first path 41, and the first path 41 includes a first switch SW1 and a first passive element P1. Furthermore, the switching circuit 4 further includes a second path 42, and the second path 42 includes a second switch SW2 and a second passive element P2. In response to the first switch SW1 and the second switch SW2 being turned on or off, the switching circuit 4 is switched to a first mode or a second mode. An equivalent impedance of the switching circuit 4 in the first mode is different from the equivalent impedance of the switching circuit 4 in the second mode.

Therefore, in response to the first switch SW1 and the second switch SW2 being turned on or off, the low frequency bands generated by the third radiating element 3 and the radiating portion 12, and the second radiating element 2 and the radiating portion 12 can shift between 617 MHz and 960 MHz.

In the antenna module M provided by the present disclosure, through structural design of the second radiating element 2 and the third radiating element 3, in conjunction with the switching circuit 4, the dual low frequency modes (i.e., from 617 MHz to 800 MHz, and from 750 MHz to 960 MHz) can be generated, thereby covering the low frequency range from 617 MHz to 960 MHz.

Moreover, in the prior art, the antenna module includes a switching circuit having multiple signal transmission paths (e.g., at least one three paths), and the antenna module needs to utilize the switching circuit including the multiple signal transmission paths to cover multiple low frequency modes. In comparison, in the present disclosure, the switching circuit 4 of the antenna module M only has two signal transmission paths (i.e., the first path 41 and the path 42). In other words, through the architecture of the dual low frequency coupling mode generated by the second radiating element 2 and the third radiating element 3 of the antenna module M, a quantity of the signal transmission path in the switching circuit 4 can be reduced.

The electronic device further includes a control circuit C. The control circuit C can control the switching circuit 4 to switch among various modes and adjust the operating frequency bands generated by the antenna module M to cover a wide frequency range in low frequency bands.

In addition, the third radiating element 3 is electrically connected to the proximity sensing circuit 5. The antenna module M further includes an inductor L, and the inductor L is electrically connected between the third radiating element 3 and the proximity sensing circuit 5. It is worth mentioning that due to the high frequency filtering characteristics of the inductor L, in the present disclosure, the inductor L can be configured to filter frequencies above 500 MHz. In other words, in the frequency bands above 500 MHz, the third radiating element 3 can be taken as a floating radiation arm.

The proximity sensing circuit 5 can be, for example, a capacitance sensing circuit. The third radiating element 3 can be used as a sensing electrode for the proximity sensing circuit 5 to measure the capacitance. In the antenna module M provided by the present disclosure, the sensing distance of the proximity sensing circuit 5 can be increased by combining the proximity sensing circuit 5 with an independent radiating element (i.e., the third radiating element 3). Therefore, the control circuit C can determine whether or not the body parts of the user is within a predetermined detection range in close proximity of the antenna module M through a variation of the capacitance sensed by the proximity sensing circuit 5. In addition, the proximity sensing circuit 5 can be integrated into the switching circuit 4, but the present disclosure is not limited thereto. In other embodiments, the proximity sensing circuit 5 can also be independently disposed outside the switching circuit 4.

As shown in FIG. 2, the radiating portion 12 includes a first extension section 12A and a second extension section 12B. The first extension section 12A extends toward the second radiating element 2 relative to the feeding portion 11, and the second extension section 12B extends away from the second radiating element 2 relative to the feeding portion 11. The first extension section 12A is used to be excited to generate an operating frequency band from 1,710 MHz to 2,300 MHz. The second extension section 12B is used to be excited to generate an operating frequency band from 2,300 MHz to 2,700 MHz.

The radiating portion 12 further includes a first segment 121, and the first segment 121 is located between the feeding portion 11 and the grounding portion 13. The first segment 121 and the third radiating element 3 are separated from each other by a first coupling gap CG1, and the first coupling gap CG1 is smaller than or equal to 7 mm. Therefore, the first segment 121 can be excited to generate an operating frequency band from 3,800 to 5,000 MHz, and the matching effect is further optimized through the design of the first coupling gap CG1.

As shown in FIGS. 2 and 3, the radiating portion 12 further includes a second segment 122, and the feeding portion 11 is located between the first segment 121 and the second segment 122. The second segment 122 is used to be excited to generate an operating frequency band from 3,000 MHz to 3,800 MHz. A part of the third radiating element 3 spans over the second segment 122 to form a stub SB. It should be noted that the first radiating element 1, the second radiating element 2, and the third radiating element 3 are not necessarily located on a same plane (e.g., a carrier S in FIGS. 4 and 5). Therefore, the fact that a part of the third radiating element 3 spans over the second segment 122 does not necessarily indicate that the part of the third radiating element 3 is connected to the second segment 122, and a projection of the part of the third radiating element 3 that is projected onto a plane where the second segment 122 is located can partially overlap the second segment 122.

As shown in FIG. 3, the stub SB has a starting end E1 and an open end E2. The starting end E1 coincides with an edge of the second segment 122. The stub SB has a path length H along the starting end E1 to the open end E2. Specifically, the path length H is a length from a midpoint of the starting end E1 to a midpoint of the open end E2. Moreover, the path length H is equal to ¼ wavelength of the operating frequency band (from 3,000 MHz to 3,800 MHz) generated by the second segment 122. Through the design of the stub SB, the impedance matching of the third radiating element 3 coupled to the first segment 121 and the second segment 122 can be adjusted to achieve good matching effect.

The third radiating element 3 includes a first widened portion 31 and a second widened portion 32. The first widened portion 31 and the second widened portion 32 are respectively located at both sides of the grounding portion 13, and the second widened portion 32 is a part of the stub SB. The first widened portion 31 has a first side 311 and a second side 312 that are opposite to each other, the second widened portion 32 has a third side 321 and a fourth side 322 that are opposite to each other. The first widened portion 31 has a first predetermined width, and the first predetermined width is a distance between the first side 311 and the second side 312. The second widened portion 32 has a second predetermined width, and the second predetermined width is a distance between the third side 321 and the fourth side 322. Preferably, both of the first predetermined width and the second predetermined width are at least greater than 3 mm. Through the design of the first widened portion 31 and the second widened portion 32, the sensing distance of the proximity sensing circuit 5 on both sides of the antenna module M is further increased, thereby improving the sensitivity of sensing changes in capacitances around the antenna module M.

Figure 4:
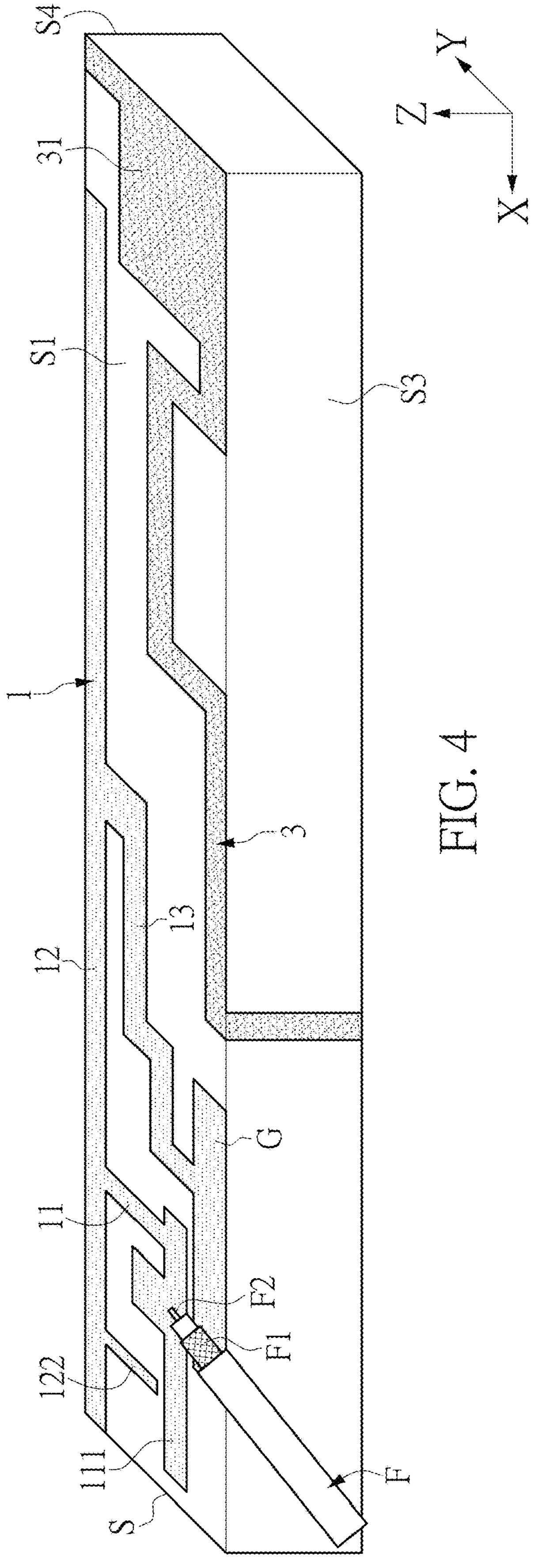
FIG. 4 is a first schematic perspective view of the antenna module according to the present disclosure.
Figure 5:
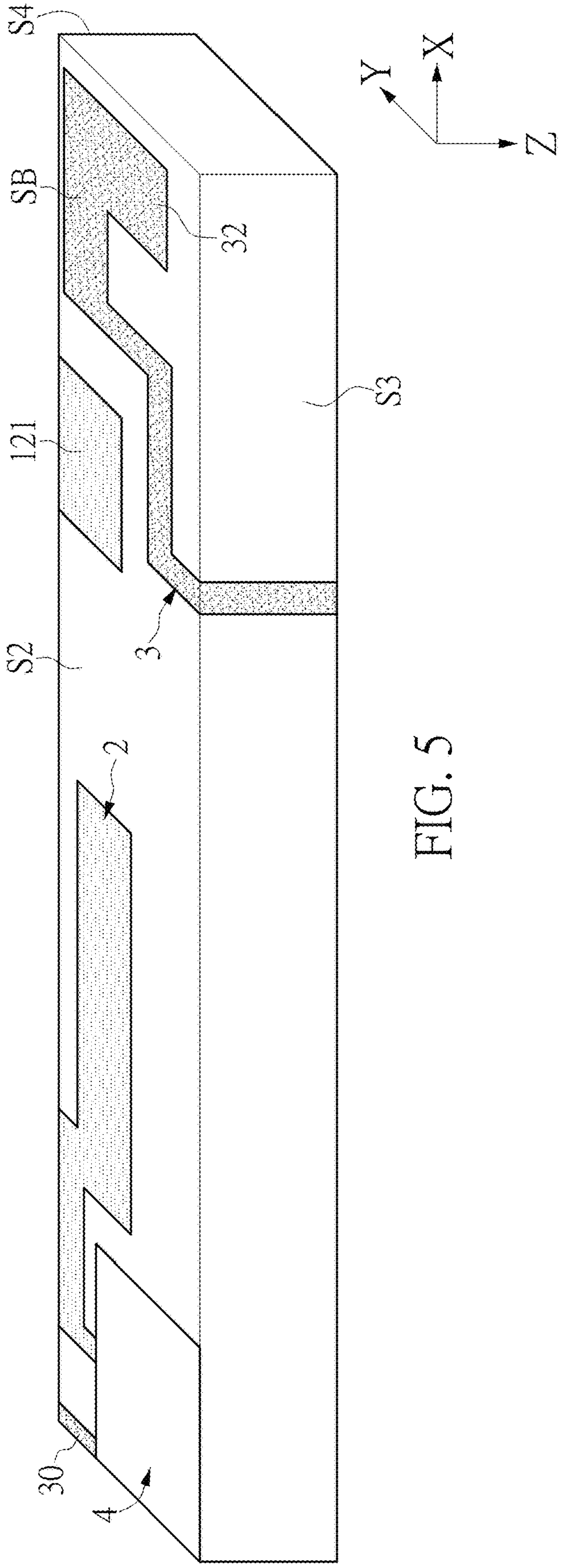
FIG. 5 is a second schematic perspective view of the antenna module according to the present disclosure.

It should be noted that, the first widened portion 31 and the second widened portion 32 are respectively located at peripheral regions on two sides of the antenna module M. As shown in FIGS. 4 and 5, when the antenna module M is disposed on the carrier S, the first widened portion 31 and the second widened portion 32 are located at both sides of the carrier 1 and as close as possible to the edges on both sides of the carrier 1.

In addition, the feeding portion 11 further includes a third segment 111. The third segment 111 and the stub SB are separated from each other by a second coupling gap CG2, and the second coupling gap CG2 is smaller than or equal to 7 mm. Therefore, the third segment 111 can be excited to generate an operating frequency band from 5,000 MHz to 5,925 MHz, and the matching effect is further optimized through the design of the second coupling gap CG2.

Referring to FIG. 4 and FIG. 5, FIG. 4 and FIG. 5 are different schematic perspective views of the antenna module according to the present disclosure. For example, the antenna module M can be disposed on the carrier S, and the first radiating element 1, the second radiating element 2, and the third radiating element 3 are metal conductors formed on different surfaces of the carrier S by laser engraving. As shown in FIG. 4 and FIG. 5, the carrier S has a first surface S1, a second surface S2, a third surface S3, and a fourth surface S4. The first surface S1 and the second surface S2 are opposite to each other. The third surface S3 and the fourth surface S4 are opposite to each other. The third surface S3 and the fourth surface S4 are connected between the first surface S1 and the second surface S2.

The feeding portion 11, the radiating portion 12, and the grounding portion 13 of the first radiating element 1 are disposed on the first surface S1, and the first segment 121 of the radiating portion 12 extends from the fourth surface S4 to the second surface S2. The ground portion 13 is connected to a grounding element G. The feeding element F includes a ground end F1 and a signal end F2. The ground end F1 is electrically connected to the grounding element G, and the signal end F2 is electrically connected to the feeding portion 11. The second radiating element 2 and the switching circuit 4 are disposed on the second surface S2. A connecting portion 30 of the third radiating element 3 is connected to the switching circuit 4. The third radiating element 3 extends from the second surface S2 to the fourth surface S4, and then extends from the fourth surface S4 to the first surface S1. As shown in FIG. 4, the first widened portion 31 is disposed on the first surface S1. Then, the third radiating element 3 extends from the first surface S1 to the third surface S3, and extends from the third surface S3 to the second surface S2. As shown in FIG. 5, the stub SB is disposed on the second surface S2.

Each segment of the third radiating element 3 can be distributed on different surfaces of the carrier S. For example, the first segment 121 and the coupling sections of the third radiating element 3 are both located on the second surface S2 of the carrier S, and the third segment 111 and the stub SB are located on the first surface S1 and the second surface S2 of the carrier S, respectively. Therefore, the coupling gaps between the third radiating element 3 and the first radiating element 1 refer to shortest distances between the third radiating element 3 and the first radiating element 1. For example, as shown in FIG. 2, the first coupling gap CG1 between the first segment 121 and the third radiating element 3 refers to the shortest distance between the first segment 121 and the third radiating element 3, and the second coupling gap CG2 between the third segment 111 and the stub SB refers to the shortest distance between the third segment 111 and the stub SB.

Figure 6:
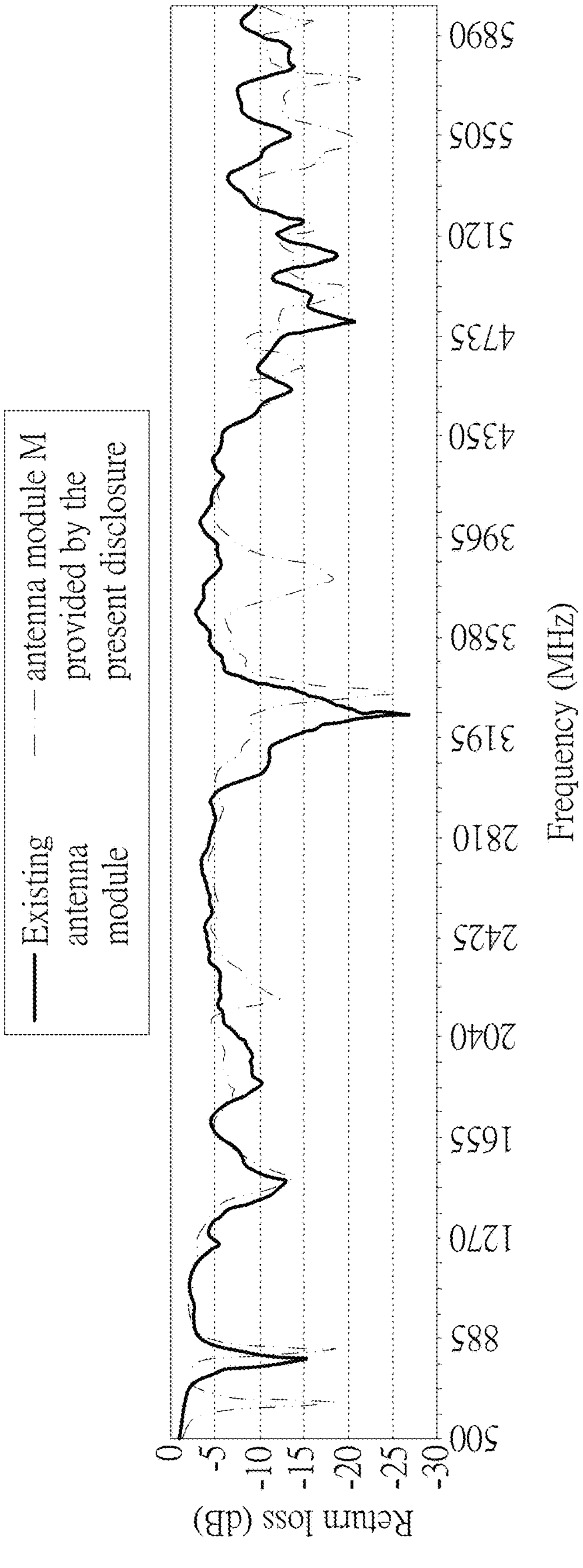
FIG. 6 is a curve diagram showing return loss of the antenna module according to the present disclosure.

Referring to FIG. 6, FIG. 6 is a curve diagram showing return loss of the antenna module according to the present disclosure. FIG. 6 shows return loss curves of the existing antenna module and the antenna module M provided by the present disclosure. The existing antenna module refers to the proximity sensing circuit not equipped with the independent floating radiation arm. The antenna module M of the present disclosure refers to the proximity sensing circuit 5 equipped with the independent radiating element. As shown in FIG. 6, since the antenna module M of the present disclosure is equipped with the independent radiating element (i.e., the third radiating element 3) through the proximity sensing circuit 5, the antenna module M with the switching circuit 4 can produce dual modes in the low frequency range (from 617 MHz to 960 MHz) to cover more frequency bands, and has wider-band performance in the medium frequency range (from 3,000 MHz to 3,800 MHz), and has good matching effect in the high frequency range (5,000 MHz to 5,925 MHz).

Figure 7:
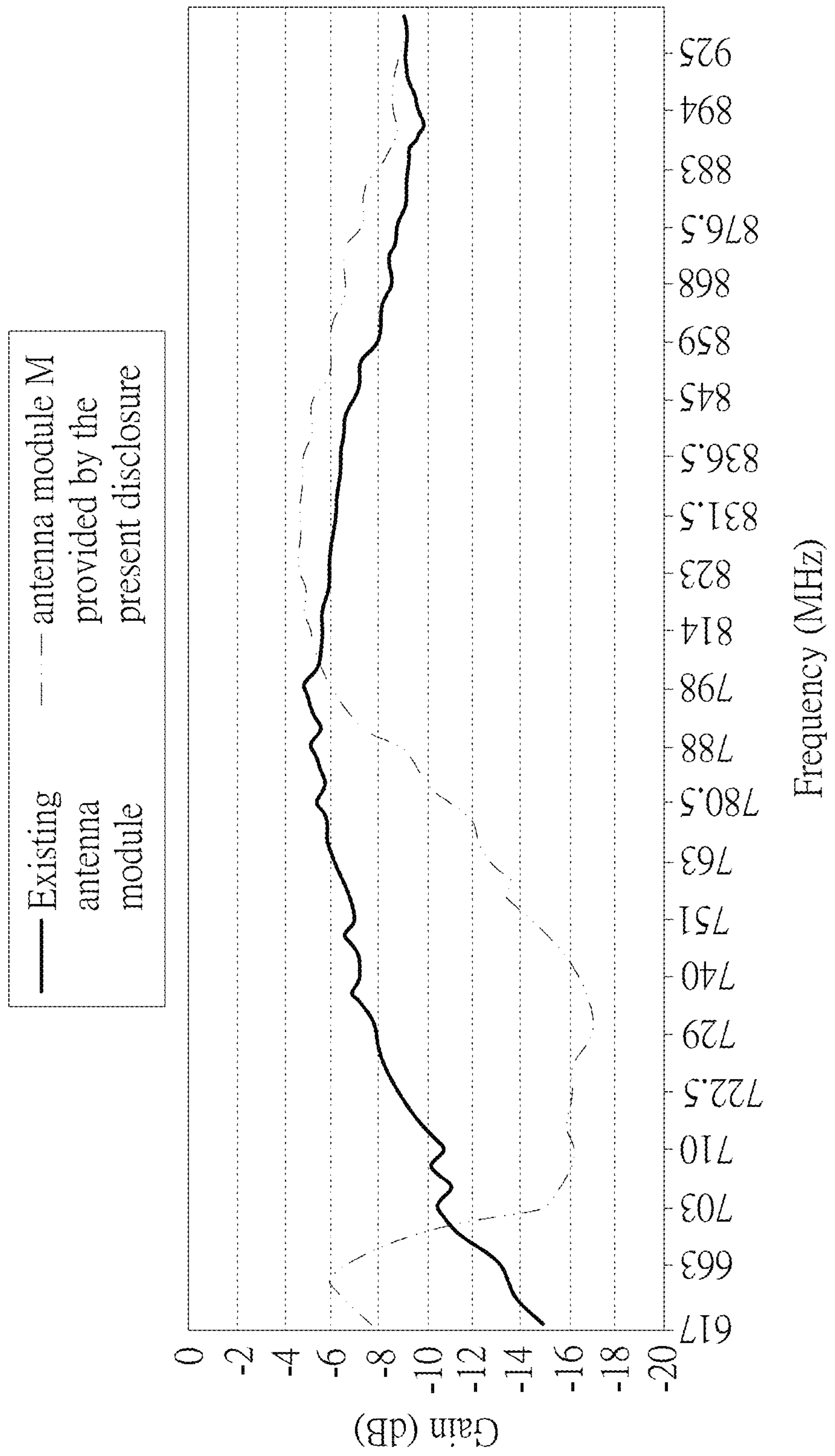
FIG. 7 is a curve diagram showing gain of the antenna module in a low frequency range according to the present disclosure.
Figure 8:
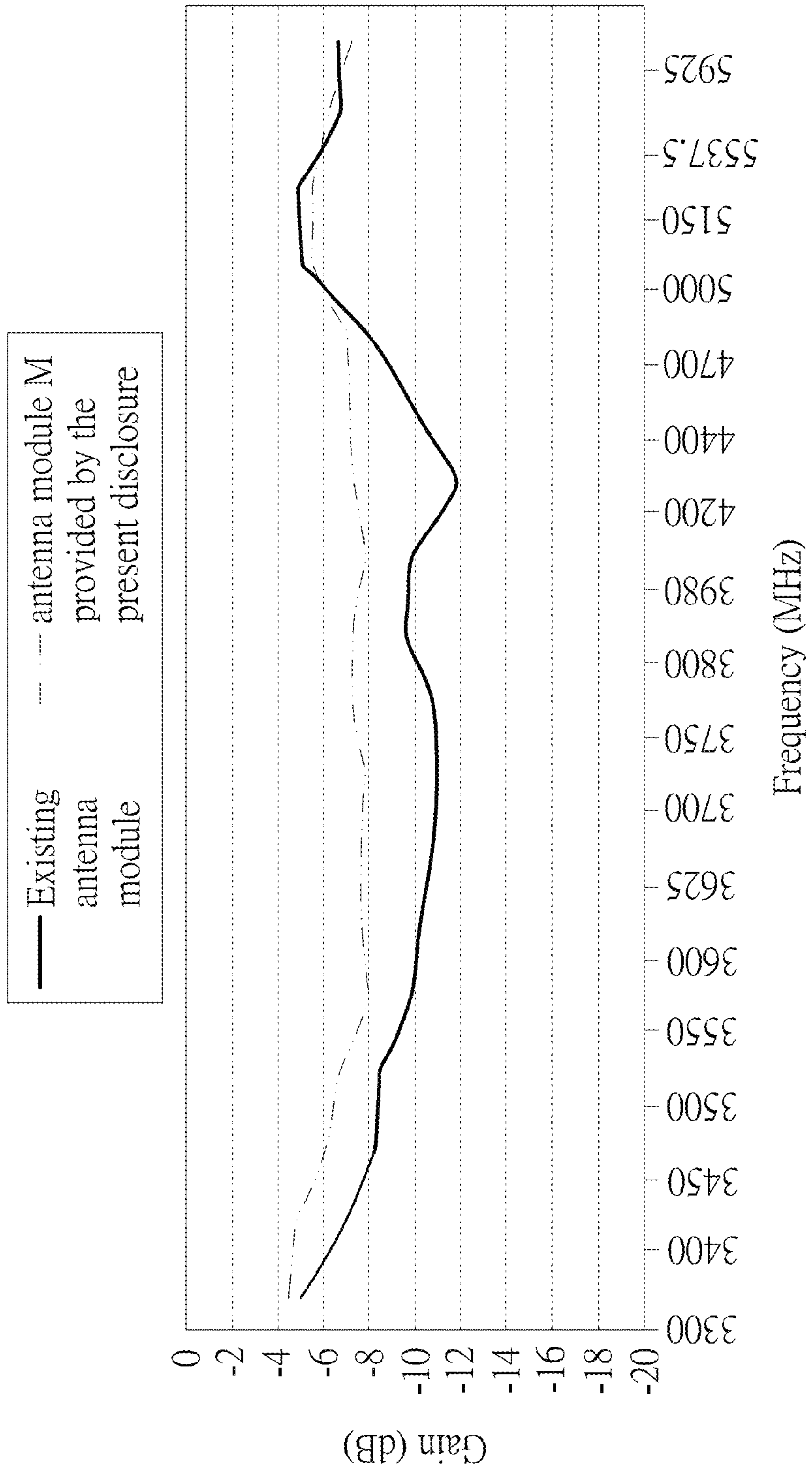
FIG. 8 is a curve diagram showing gain of the antenna module in a high frequency range according to the present disclosure.

Referring to FIG. 7 and FIG. 8, FIG. 7 is a curve diagram showing gain of the antenna module in a low frequency range according to the present disclosure, and FIG. 8 is a curve diagram showing gain of the antenna module in a high frequency range according to the present disclosure. FIG. 7 and FIG. 8 show gain of the existing antenna module and the antenna module M of the present disclosure in the low frequency range (from 617 MHz to 960 MHz), and the medium and high frequency range (from 3,000 MHz to 5,925 MHz). As shown in FIGS. 7 and 8, since the antenna module M of the present disclosure is equipped with the independent radiating element (i.e., the third radiating element 3) through the proximity sensing circuit 5, the antenna module M can produce dual modes in the low frequency range to cover more frequency bands, and has good efficiency performance in the medium and high frequency range.

Beneficial Effects of the Embodiments

In the electronic device D and the antenna module M provided by the present disclosure, by virtue of "the third radiating element 3 being electrically connected to the proximity sensing circuit 5" and "the third radiating element 3 and the second radiating element 2 being separated from each other, and the third radiating element 3 and the radiating portion 12 being separated from and coupled with each other," the proximity sensing circuit 5 of the antenna module M can be used with an independent radiating element (i.e., the third radiating element). Therefore, the sensing distance of a proximity sensing circuit can be improved.

Through the design of the first widened portion 31 and the second widened portion 32, the sensing distance of the proximity sensing circuit 5 on both sides of the antenna module M is further increased, thereby improving the sensitivity of sensing changes in capacitances around the antenna module M.

Moreover, the third radiating element 3 can optimize the antenna characteristics and generate dual low-frequency modes with the second radiating element 2 to achieve wider-band operation. Through the configuration of the third radiating element 3 and the second radiating element 2, in conjunction with the switching circuit 4, the antenna module M can produce dual modes in the low frequency range (from 617 MHz to 960 MHz) to cover more frequency bands, and has wider-band performance in the medium frequency range (from 3,000 MHz to 3,800 MHz), and has good matching effect in the high frequency range (5,000 MHz to 5,925 MHz).

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. An electronic device, comprising:

a housing; and an antenna module disposed in the housing and including:

- a first radiating element including a feeding portion, a radiating portion, and a grounding portion, wherein the feeding portion and the grounding portion are connected to the radiating portion;
- a switching circuit;
- a proximity sensing circuit;
- a second radiating element electrically connected to ground through the switching circuit, wherein the second radiating element and the radiating portion are separated from and coupled with each other; and a third radiating element electrically connected to the proximity sensing circuit, wherein the third radiating element and the second radiating element are separated from each other, and the third radiating element and the radiating portion are separated from and coupled with each other;

wherein two ends of the third radiating element are respectively located on two opposite sides of the grounding portion, and a projection of a portion of the third radiating element onto a plane in which the grounding portion is located partially overlaps a projection of the grounding portion.

2. The electronic device according to claim 1, wherein the radiating portion includes a first segment that is located between the feeding portion and the grounding portion, the first segment and the third radiating element are separated from each other by a first coupling gap, and the first coupling gap is smaller than or equal to 7 mm.

3. The electronic device according to claim 2, wherein the radiating portion further includes a second segment, the feeding portion is located between the first segment and the second segment, and a part of the third radiating element spans over the second segment to form a stub.

4. The electronic device according to claim 3, wherein the third radiating element includes a first widened portion and a second widened portion, the first widened portion and the second widened portion are respectively located at both sides of the grounding portion, and the second widened portion is a part of the stub.

5. The electronic device according to claim 4, wherein the first widened portion and the second widened portion are respectively located at peripheral regions on two sides of the antenna module.

6. The electronic device according to claim 5, wherein the first widened portion has a first side and a second side that are opposite to each other, the second widened portion has a third side and a fourth side that are opposite to each other, a first predetermined width is defined between the first side and the second side, a second predetermined width is defined between the third side and the fourth side, and both of the first predetermined width and the second predetermined width are at least greater than 3 mm.

7. The electronic device according to claim 4, wherein the second segment is used to be excited to generate an operating frequency band, the stub has a starting end and an open end, the starting end coincides with an edge of the second segment, the stub has a path length along the starting end to the open end, and the path length is equal to ¼ wavelength of the operating frequency band.

8. The electronic device according to claim 3, wherein the feeding portion includes a third segment, the third segment and the stub are separated from each other by a second coupling gap, and the second coupling gap is smaller than or equal to 7 mm.

9. The electronic device according to claim 1, wherein the switching circuit includes a first path, and the first path includes a first switch.

10. The electronic device according to claim 9, wherein the first path further includes a first passive element, the switching circuit further includes a second path, and the second path includes a second switch and a second passive element; wherein, in response to the first switch and the second switch being turned on or off, the switching circuit is switched to a first mode or a second mode; wherein an equivalent impedance of the switching circuit in the first mode is different from the equivalent impedance of the switching circuit in the second mode.

11. The electronic device according to claim 1, the antenna module further includes an inductor, and the inductor is electrically connected between the third radiating element and the proximity sensing circuit.

12. An electronic device, comprising:

a housing; and an antenna module disposed in the housing and including:

a first radiating element including a feeding portion, a radiating portion, and a grounding portion, wherein the feeding portion and the grounding portion are connected to the radiating portion;

a switching circuit;

a proximity sensing circuit;

a second radiating element electrically connected to ground through the switching circuit, wherein the second radiating element and the radiating portion are separated from and coupled with each other; and a third radiating element electrically connected to the proximity sensing circuit, wherein the third radiating element and the second radiating element are separated from each other, and the third radiating element and the radiating portion are separated from and coupled with each other;

wherein two ends of the third radiating element are respectively located on two opposite sides of the grounding portion, and a projection of a portion of the third radiating element onto a plane in which the grounding portion is located partially overlaps a projection of the grounding portion.

13. The antenna module according to claim 12, wherein the radiating portion includes a first segment that is located between the feeding portion and the grounding portion, the first segment and the third radiating element are separated from each other by a first coupling gap, and the first coupling gap is smaller than or equal to 7 mm.

14. The antenna module according to claim 13, wherein the radiating portion further includes a second segment, the feeding portion is located between the first segment and the second segment, and a part of the third radiating element spans over the second segment to form a stub.

15. The antenna module according to claim 14, wherein the third radiating element includes a first widened portion and a second widened portion, the first widened portion and the second widened portion are respectively located at both sides of the grounding portion, and the second widened portion is a part of the stub.

16. The antenna module according to claim 15, wherein the first widened portion and the second widened portion are respectively located at peripheral regions on two sides of the antenna module.

17. The antenna module according to claim 16, wherein the first widened portion has a first side and a second side that are opposite to each other, the second widened portion has a third side and a fourth side that are opposite to each other, a first predetermined width is defined between the first side and the second side, a second predetermined width is defined between the third side and the fourth side, and both of the first predetermined width and the second predetermined width are at least greater than 3 mm.

18. The antenna module according to claim 15, wherein the second segment is used to be excited to generate an operating frequency band, the stub has a starting end and an open end, the starting end coincides with an edge of the second segment, the stub has a path length along the starting end to the open end, and the path length is equal to ¼ wavelength of the operating frequency band.

19. The antenna module according to claim 14, wherein the feeding portion has a third segment, the third segment and the stub are separated from each other by a second coupling gap, and the second coupling gap is smaller than or equal to 7 mm.

* * * * *